Jan. 27, 1931.  R. B. OTWELL  1,790,595
TRACTION APPARATUS FOR AGRICULTURAL IMPLEMENTS
Original Filed April 9, 1927  5 Sheets-Sheet 4
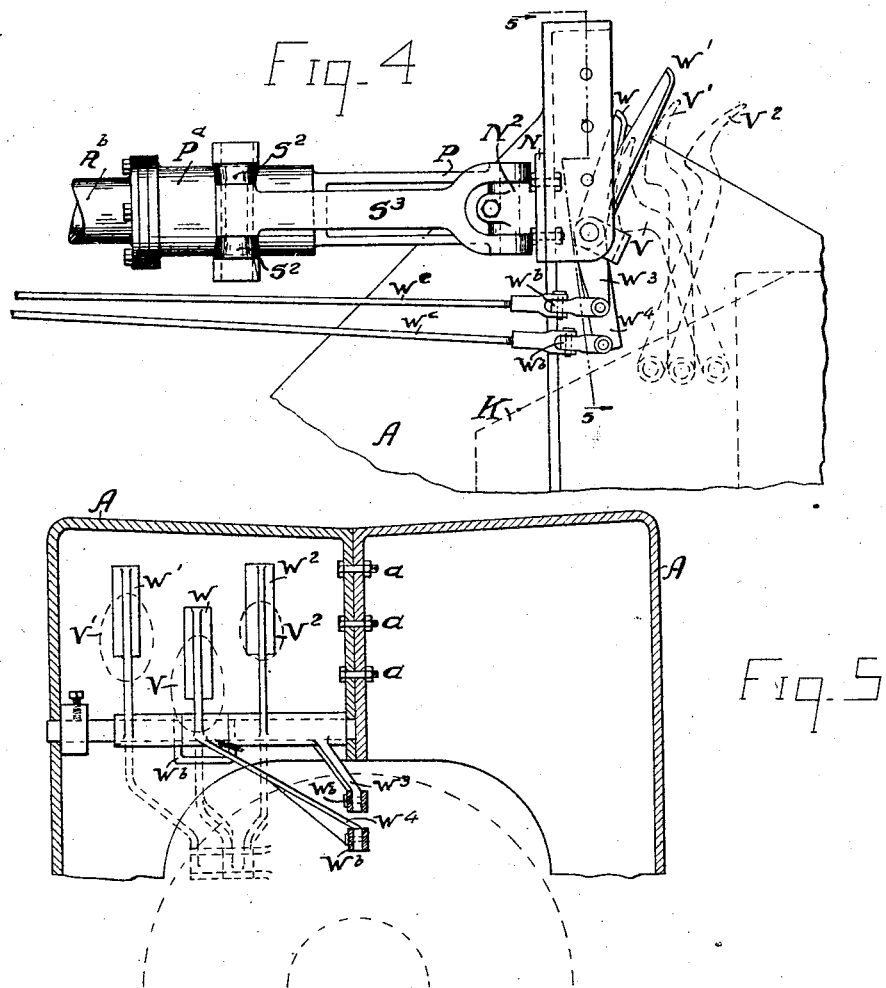
Ralph B. Otwell
INVENTOR
BY S. E. Thomas
ATTORNEY Patented Jan. 27, 1931

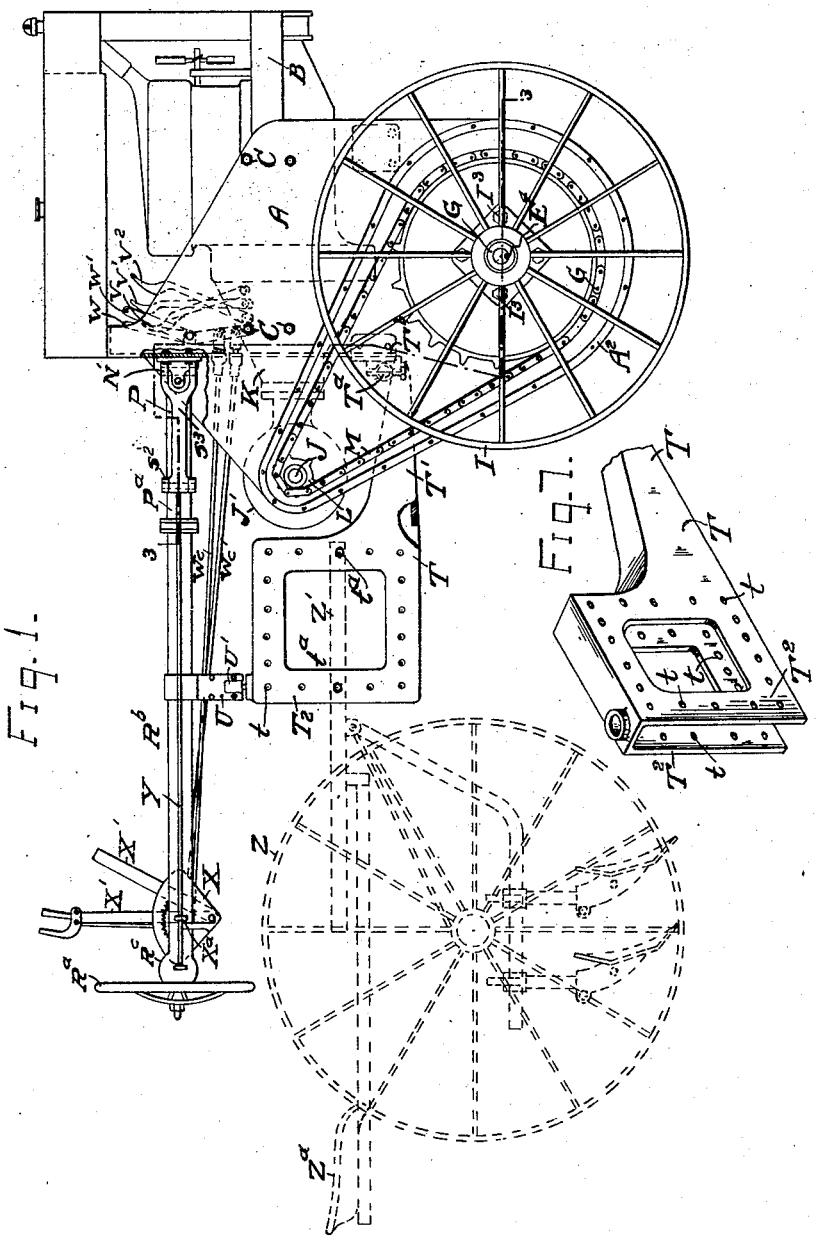

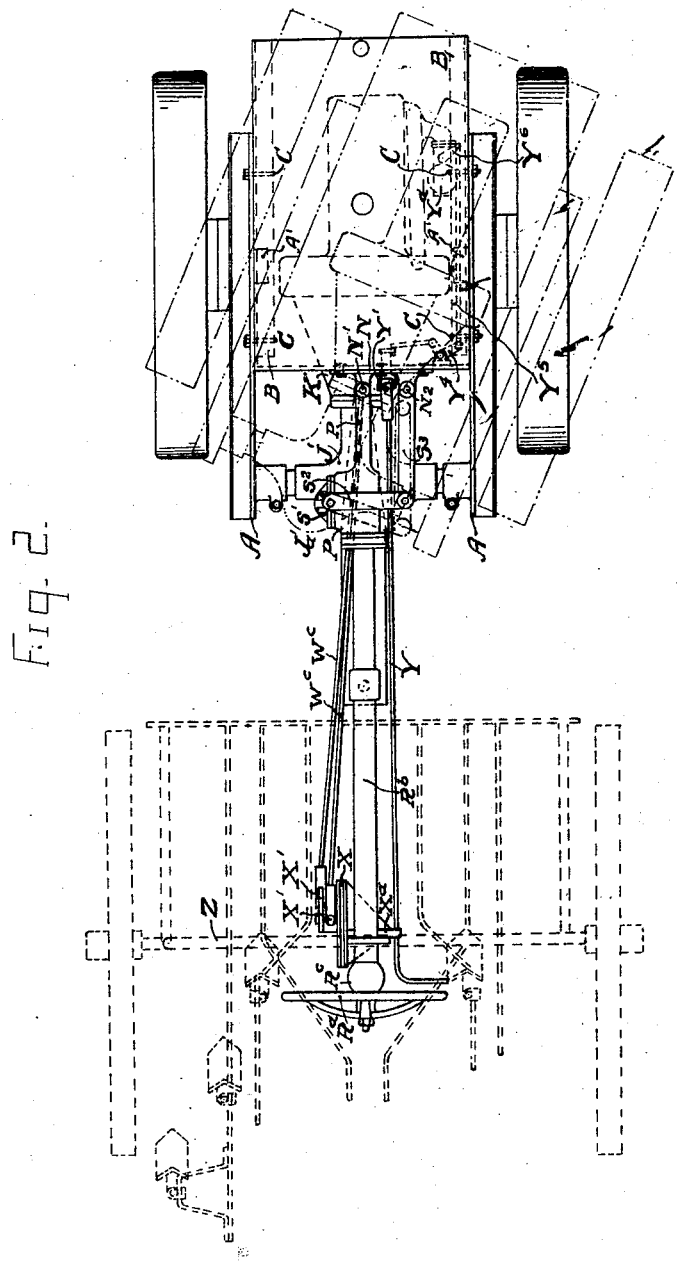

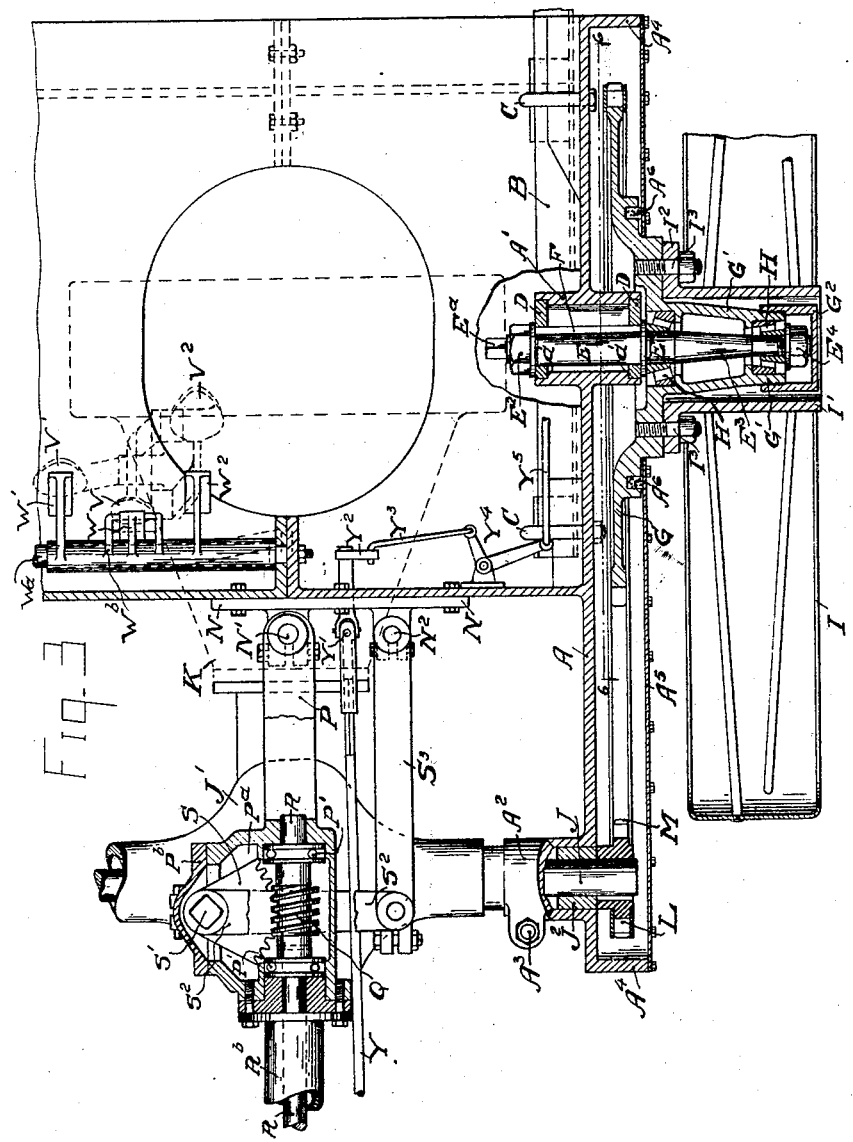

1,790,595

UNITED STATES PATENT OFFICE

RALPH B. OTWELL, OF DETROIT, MICHIGAN, ASSIGNOR TO DETROIT HARVESTER COMPANY, OF DETROIT, MICHIGAN, A CORPORATION OF MICHIGAN

TRACTION APPARATUS FOR AGRICULTURAL IMPLEMENTS

Original application filed April 9, 1927, Serial No. 182,290. Divided and this application filed October 22, 1928. Serial No. 314,170.

My invention relates to a traction device, for hauling agricultural implements and as claimed herein is a division of an application for patent filed by me on the 9th day of April, 1927, Serial No. 182,290.

It is well-known that the engine and other parts of automobiles are often in good condition for extended use long after the owner is ready to discard the vehicle in which they are installed on account of its model or appearance, and especially is this true of certain types of automobiles but as the amount allowed on an exchange for a new car is relatively small, the owner while desiring a new vehicle for business or pleasure, hesitates to discard his old car at practically a total loss and assume the expense of a new motor vehicle so long as the old one may be operated. Especially is this true in farming communities where the farmer-owner knows that many years of usefulness are still possible to the engine and other working parts of the car, but on account of the general appearance of the vehicle it cannot be longer used for the purpose it was originally designed with any degree of satisfaction.

The object therefore of the present invention is to provide means whereby the engine and certain other parts of a well-known type of motor vehicle may be installed in a supporting frame adapted for hauling the usual type of horse-drawn agricultural tools such as cultivators, hay rakes, harrows, mowers, corn planters, and to perform any farm, garden, or lawn work ordinarily done by horse or team.

It will be evident therefore that in providing means whereby the engine and other parts of a motor vehicle may extend their period of usefulness the owner immediately becomes a prospect for a new pleasure or commercial vehicle to replace the one from which the engine and parts have been removed in the creation of a new traction apparatus for farm, garden, or lawn work.

It will be obvious therefore that one object of the present invention is to provide an acceptable outlet for motors and other parts which have outlived their usefulness in pleasure or commercial vehicles, but which still remain serviceable for years in another line of work.

A further object of the invention is to provide means adapted to receive the tongue or pole of different types of horse-drawn farm tools,—the construction being such that the tongues of machines at varying altitudes from the ground level may be readily coupled to the frame of the traction apparatus.

A further object of the invention is to provide means whereby the apparatus may be steered and its direction controlled by the driver from the latter's seat on the agricultural implement coupled therewith.

A further object of the invention is to provide means whereby traction wheels adapted for different classes of work may be interchangeably mounted on the axles of the traction apparatus without disturbing or interfering with the other mechanism,—for example the owner may install traction wheels designed particularly for such work as hoeing corn, cultivating, raking, etc., or the wheels may be replaced by others of wider tread for hillside farming or other work.

A further object of the invention is to provide means whereby any slack occurring in the driving chains may be readily taken up, and also for protecting the traction wheel bearings and the sprocket gears and driving chain against the entry of dirt, sand or gravel.

In carrying the invention into effect a suitable divided frame, bolted together to form a single unit, supports the prime mover of a discarded automobile mounted thereon;— the side walls of the divided frame carrying a pair of stub axles on which are mounted sprocket wheels respectively bolted to the hubs of the traction wheels of the apparatus.

The sprocket wheels, bolted to the traction wheels, are enclosed in dust-proof cases—integral with the divided frame—which also cover the driving chains and the small driving sprocket wheels mounted on the differential axle or shaft,—cut down to adapt it for present use and driven by a shortened propeller shaft by the power unit. The sprocket chain connection between the small and the large sprocket wheels, provides the necessary speed reduction and driving connection for the traction wheels.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation partly in section, of the traction apparatus showing graphically in dotted lines a cultivator coupled therewith, the cover of the driving sprocket wheel case having been removed to show the driving connection between the power unit and the traction wheels.

Figure 2 is a plan view of the apparatus shown in Figure 1 indicating in dotted lines the traction apparatus turned—as when rounding a curve—by steering mechanism controlled by a steering wheel from the seat of the agricultural implement.

Figure 3 is a fragmentary plan view partly in section showing the eccentric mounting of one of the stub axles carried by a hub in the supporting frame, its spindle extending into the hub of a sprocket wheel bolted to the traction wheel,—the view also disclosing a worm and sector on the steering post for controlling the traction apparatus from the seat of the agricultural implement.

Figure 4 is a fragmentary side elevation showing the mechanism for operating the foot pedals controlling the speed and direction taken by the traction apparatus.

Figure 5 is a fragmentary cross-sectional view taken on or about line 5—5 of Figure 4 showing in dotted lines the foot pedals and the rocking paddles for operating the same.

Figure 7 is a perspective view of the coupling member, carried by the traction apparatus for connecting the farming implements thereto.

Figure 6:
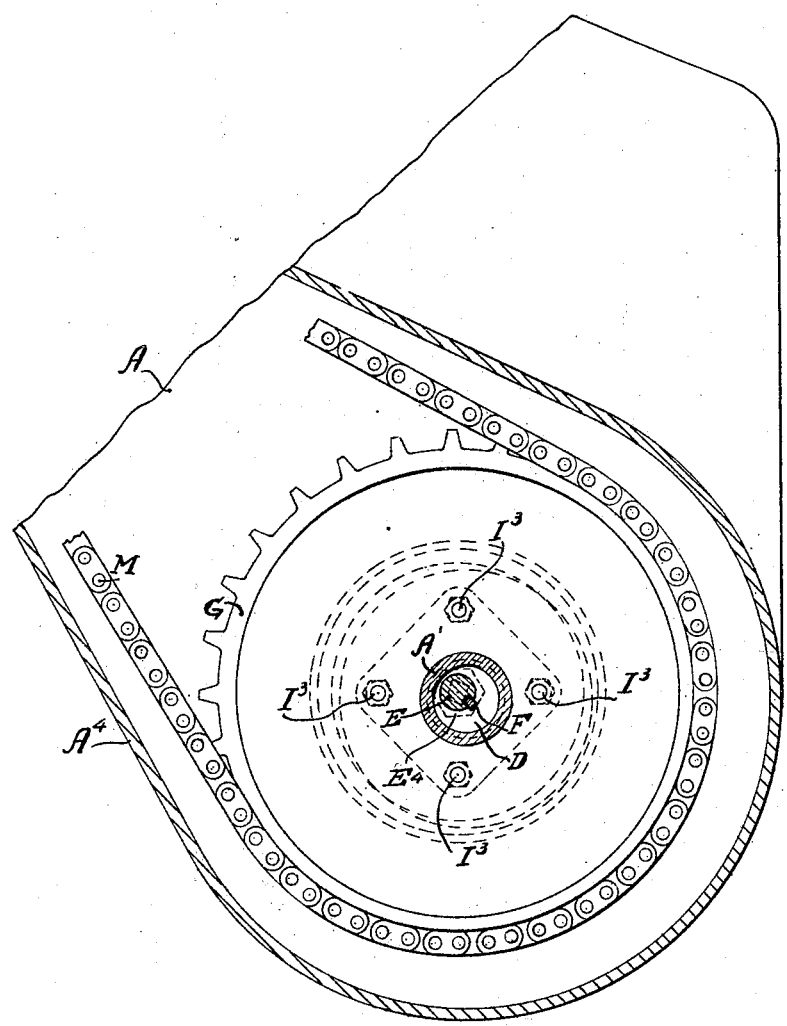
Figure 6 is a fragmentary elevation and sectional view through the sprocket wheel case and axle taken on or about line 6—6 of Figure 3 showing the eccentric mounting of the axle in the hub of the supporting frame.

Referring now to the letters of reference placed upon the drawings:

A, A, denote the members of a divided frame of the traction apparatus bolted together at $a$ to form a single unit. The side walls of the divided frame are secured to the sills B corresponding with the sills of an automobile chassis, but cut relatively shorter, and secured thereto by U-shaped bolts C, C, embracing the sills and projecting through the side walls of the frame.

The lower portion of each side wall is provided with a hub $A^1$, $A^1$, in which are mounted discs D, D, spaced apart and bearing against shoulders $a^1$, $a^1$, formed in the hubs.

The spaced discs are provided with openings eccentric to their perimeters to receive the stub axles E, E, each provided with a flange $E^1$ overlapping the outer disc, the axles being threaded on their inner end to receive a nut $E^2$ with a washer overlapping the inner disc. F is a key projecting from a keyway in the stub shafts into corresponding grooves provided in the discs to secure the axle against rotation in the discs;—the discs however may be rotated in the hubs $A^1$, $A^1$, of the frame shifting the axles eccentrically therein, the object of which will be hereafter explained. G is a sprocket wheel provided with a hub $G^1$ sleeved on the spindle $E^3$ of the axle fitted with cone bearings H, H, of usual construction.

$E^4$ is a nut threaded on the outer end of the spindle with a washer sleeved on the spindle overlapping the end of the cone bearings. $G^2$ is a cap screwed on the hub $G^1$. I, I, are traction wheels with a hub $I^1$ sleeved over the hub $G^1$ of the sprocket wheels G and with an outwardly extending flange $I^2$, through which extend a plurality of bolts $I^3$ to secure the traction wheels to the sprocket wheels.

J is the rear axle shaft of a motor vehicle made relatively shorter to adapt it for the present installation, actuated through differential gearing—not shown—enclosed in the gear case $J^1$, bolted to the end of the crank case K of the engine. The rear axle shaft J is journalled in bushings $J^2$ supported in a divided hub $A^2$ projecting from the side walls of the frame. $A^3$ is a bolt extending through the divided hub to clamp it to the housing enclosing the rear axle or shaft.

L is a relatively small driving sprocket wheel keyed to the shaft J, connected by a driving chain M, with the sprocket wheel G bolted to the traction wheels I, I, the slack of which may be taken up by first unscrewing the nut $E^2$ on the end of the axle E supported by the discs D, D, eccentrically in the hubs $A^1$, $A^1$, of the frame. By applying a wrench to the squared end $E^a$ of the axle, the discs with the axle may be adjusted eccentrically in the hubs thereby taking up slack in the driving chains,—the nuts $E^2$ are then tightened to secure the axle against displacement.

$A^4$ indicates a flange integral with the side walls of the frame forming with a cover plate $A^5$ bolted thereto, a case housing the sprocket wheels G and L and the driving chain M connecting the sprocket wheels. $A^6$ denotes a felt ring lodged in an annular groove in the wall of the sprocket wheel which bears against the cover plate $A^5$ to provide a seal against the entry of dust.

N is a bracket fixture bolted to the frame having a rearwardly extending divided lug in which is clamped a vertical pivot pin N¹, disposed in line with the longitudinal axis of the machine. Engaging the pivot N¹, is a yoke-shaped casting P chambered at Pᵃ to receive a worm shaft Q, sleeved upon and secured to a steering column R,—supported in suitable bearings P¹ carried by the casting P, the column being fitted with a steering wheel Rᵃ at its outer end.

S denotes a segment in mesh with the teeth of the worm shaft supported upon a transverse stub shaft S¹ journalled in the casting P. Fitted to the squared ends of the stub shaft S¹ are a pair of rocking arms S², pivoted to a link S³, in turn pivoted to a vertical pin N² supported in a divided lug projecting rearwardly from the bracket fixture N, bolted to the frame. The chamber Pᵃ of the casting P is fitted with a removable cover Pᵇ whereby access may be gained to the parts enclosed therein.

The column R with its steering wheel Rᵃ extends rearwardly in convenient position to the driver's seat Zᵃ on the agricultural tool Z coupled to the traction apparatus. The steering column is enclosed in a drive shaft tube Rᵇ of an automobile from which the power unit has been taken,—this tube has a flange at its forward end bolted to the chambered casting P, and the housing Rᶜ at its opposite end serves to support a bracket casting X hereinafter more fully described.

It will now be seen that upon the adjustment of the steering wheel Rᵃ carried by the steering column, the worm gear Q fitted to the steering column will actuate the toothed segment S, mounted on the transverse shaft S¹, swinging the rocking arms S², causing the traction apparatus to turn thereby shifting its direction.

T is a coupling member located below the steering column comprising a casting having a forwardly extending arm T¹ connected by a universal joint Tᵃ supported by a bracket Tᵇ bolted to the frame in vertical alignment with the pivot N¹ supported in the bracket fixture N above. The rear end of the coupling member is of substantially rectangular form with annular spaced walls T², T², each provided with a plurality of holes t registering with those of the other wall, whereby the tongue Z¹ of the agricultural implement may extend between the walls and be secured thereto by transverse bolts tᵃ, tᵃ, extending through the tongue and walls.

The object in constructing the coupling member as shown is to adapt it to receive the tongues of various agricultural implements which may extend at different angles and altitudes from the ground.

The rear end of the coupling member is supported in a depending bracket U sleeved upon the housing of the steering wheel shaft, its lower end supporting a universal joint U¹ co-operating with the joint Tᵃ of the coupling member whereby the traction device will adapt itself to any irregularities in the ground surface when coupled to a cultivator or other farm tool.

V, V¹, V², indicate the usual foot pedals diagrammatically indicated in dotted lines in Figures 1, 3, 4 and 5, controlling the "reverse", "clutch", "high speed" and "brake" mechanisms, the application and operation of which is well understood in automobile engineering,—it is therefore not considered necessary to expand the description of the present invention to that extent as the operation of the parts are identical with that common in automobile practice.

To operate these several pedals however from the driver's seat on the agricultural implement, a plurality of rocking paddles W, W¹, W², adapted to bear upon the respective pedals are loosely mounted upon a shaft Wᵃ mounted in the supporting frame A—see Figures 3 and 5. The paddles W and W² respectively controlling the clutch and brake mechanisms are linked by a yoke Wᵇ that they may operate together when actuated by the rod Wᶜ through the shifting of its manual controlling lever.

These paddles are provided with depending arms W³, W⁴, severally connected through yokes Wᵇ with the rods Wᵉ, Wᶜ, extending rearwardly to suitable manually operated controlling levers X¹ pivoted to the quadrant X in turn supported by the tube enclosing the steering column.

Y is a rod supported at one end in an extension Xᵃ of the bracket X, below the steering wheel, and is fitted at its opposite end with a universal joint Y¹ provided with a rocker arm Y², connected by a link Y³, to one arm of a bell-crank Y⁴, in turn pivoted to a bracket secured to the frame;—the other arm of the bell-crank being connected by a rod Y⁵ to the rocker Y⁶ of the carburetor Yᵃ to control the intake of the latter.

Having indicated the several parts by reference letters, the operation of the device will be obvious and its construction readily understood.

The tongue of the agricultural implement to be hauled by the traction device is shortened to such an extent as will bring the driver's seat in convenient position for the driver to operate the steering wheel of the traction device when coupled thereto.

As the altitude of the tongue from the ground varies in different tools to a greater or lesser extent, the rectangular coupling member is provided with a plurality of holes through its spaced walls so that the tongue (if of wood) may be located between the latter, suitable holes being bored transversely through the tongue for the passage of bolts extending through the spaced walls of the coupling member.

The traction device is steered and governed entirely from the driver's seat on the agricultural implement, and to adapt it for different classes of farm work, wheels of relatively different tread may be mounted upon the axle without interfering with the working of the device in making the change.

Having thus described my invention what I claim is:

1. A traction device comprising a frame; a power unit carried by the frame; a yoke-shaped casting pivoted to the frame; a steering column including a worm shaft journaled in the yolk-shaped casting; a segment, including a rock shaft journaled in the yoke-shaped casting, having teeth in mesh with the worm shaft; a rocking arm carried by the shaft of the segment; a link connecting the rocking arm with the frame at one side of the pivotal connection between the yoke-shaped casting and said frame; traction wheels journaled at the sides of the frame; and means for driving the wheels from the power unit.

2. A traction device as specified in claim 1 in combination with a housing for the steering column; and a coupling member pivotally connected with the frame and the housing of the steering column.

3. A traction device including a frame having spaced side walls to receive a power plant supported between the walls, a casting pivoted to the frame in which the forward end of a steering column is journaled, a sleeve inclosing the steering column; a coupling member located below the steering column consisting of a forwardly extending arm and a pair of integral substantially rectangular perforated frames, spaced apart to receive the tongue of an agricultural implement, adapted to be coupled therewith by a bolt extending through the holes in the coupling frame and the tongue of the implement; a universal joint connecting said forwardly extending arm with the frame of the traction device in vertical alignment with the pivotal connection between the casting in which the steering column is journaled and said frame; and a universal joint connecting the rear end of the coupling member with the sleeve inclosing the steering column, as and for the purpose described.

4. A traction device comprising a divided frame, bolted together to form a single unit, having vertical side walls spaced apart; a power unit supported between the side walls of the frame; a steering column; a yoke-shaped casting pivoted to the frame in which the forward end of the steering column is journaled; a rearwardly projecting sleeve inclosing the steering column, a coupling member pivoted at one end to the frame; and means including a universal joint for supporting the opposite end of said coupling member from the rearwardly projecting sleeve.

5. A traction device comprising a frame including vertical side walls spaced apart; a power unit; means adapted to support a power unit bolted to the side walls and projecting beyond the forward end of the latter; a bracket bolted to the rear end of the frame; a yoke-shaped casting pivoted to the bracket; a steering column including a worm shaft journaled in the yoke-shaped casting; a segment including a rock-shaft journaled in the yoke-shaped casting, having teeth in mesh with the worm shaft; a rocking arm mounted on the shaft of the segment; and a link connecting the rocking arm with the bracket at one side of the pivotal connection between the yoke-shaped casting and the bracket.

In testimony, I sign this specification.

RALPH B. OTWELL.